US012809929B2

(12) United States Patent
Sueda

(10) Patent No.: US 12,809,929 B2
(45) Date of Patent: Nov. 24, 2026

(54) CONFIGURATION-BASED RECOMMENDER SYSTEM FOR A DIGITAL PLATFORM

(71) Applicant: Universal Electronics Inc., Scottsdale, AZ (US)

(72) Inventor: Masakazu Sueda, Kawasaki (JP)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 19/097,491

(22) Filed: Apr. 1, 2025

(65) Prior Publication Data

US 2026/0300420 A1 Oct. 1, 2026

(51) Int. Cl.
*G06F 16/90* (2019.01)
*G06F 16/9538* (2019.01)

(52) U.S. Cl.
CPC ................................ *G06F 16/9538* (2019.01)

(58) Field of Classification Search
CPC .................................................. G06F 16/9538
See application file for complete search history.

(56) References Cited

U.S. PATENT DOCUMENTS

| | | | | |
|---|---|---|---|---|
| 12,141,215 | B2 | 11/2024 | Leveau | |
| 2022/0215417 | A1 * | 7/2022 | Hatambeiki | ....... G06Q 30/0225 |
| 2025/0139662 | A1 | 5/2025 | Sueda | |

OTHER PUBLICATIONS

Su et al., Android app recommendation approach based on network traffic measurement and analysis, 2015 IEEE Symposium on Computers and Communication (ISCC), 2015 [retrieved Jan. 10, 2016]. Retrieved from the Internet: doi: 10.1109/ISCC.2015.7405642 (Year: 2015).*

Yin et al., IoT ETEI: End-to-End IoT Device Identification Method, 2021 IEEE Conference on Dependable and Secure Computing (DSC), 2021 [retrieved Jan. 10, 2026]. Retrieved from the Internet: doi: 10.1109/DSC49826.2021.9346251 (Year: 2021).*

U.S. Appl. No. 19/057,689, filed Feb. 19, 2025.

* cited by examiner

*Primary Examiner* — Kristopher Andersen

(74) *Attorney, Agent, or Firm* — Greenberg Traurig, LLP

(57) ABSTRACT

A system incorporates a search result having an ordered listing of a plurality of potential network devices/apps. Dataflow data for each of the plurality of potential network devices/apps considered as being coupled with one or more existing network devices and/or apps installed on one or more existing network devices within a home network system configuration of a user is retrieved from a database. The dataflow data is used with a weighted ranking algorithm to assign a priority to each of the plurality of potential network devices/apps. The priority assigned to each of the plurality of potential network devices/apps is then used to order the listing of the plurality of potential network devices/apps.

8 Claims, 3 Drawing Sheets

CONFIGURATION-BASED RECOMMENDER SYSTEM FOR A DIGITAL PLATFORM

BACKGROUND

PageRank is an algorithm used to rank websites based on their importance in search engine results. The PageRank algorithm outputs a probability distribution used to represent the likelihood that a person randomly clicking on links will arrive at any particular web page. PageRank can be calculated for collections of websites, documents, or nodes of any size. The PageRank computations require multiple passes, called "iterations," through the inlink/outlink collection to adjust approximate PageRank values to more closely reflect the theoretical true value.

The Weighted PageRank algorithm, as an extension of the conventional PageRank algorithm, assigns higher rank values to more popular (important) pages instead of dividing the rank value of a page evenly among its outlink pages. Each outlink page gets a value proportional to its popularity, e.g., its number of inlinks and outlinks.

As described in U.S. Pat. No. 12,141,215, it is known to use a weighted PageRank algorithm to generate contact suggestions for a user of a social network. A first score is computed for each of the plurality of users using an edge-weighted ranking algorithm based on the user graph. A second score is computed, using a machine learning model, for each of the plurality of users whereby the second score of each user is, at least partially, based on the first score of said user and a representative of a probability of a first user sending a connection request to said user. A ranked contact suggestion list of one or more of the plurality of users is generated, the one or more users being ranked based on their respective second score.

SUMMARY

As technological advancements enable the massive generation, collection, sharing, and application of data under the connected smart home and virtual environments, systematic dataflows that occur in daily life from the use of home network systems by household users to enhance energy management, convenience, entertainment, etc. will continue to influence future scenarios for value creation. More specifically, connected devices/apps that demonstrate their compatibility and interoperability to acquire and process operational/behavioral data from other connected devices/apps in the existing home network system and/or from household user's cloud/virtual environments for further application will gain importance (or centrality) to pave the way for value creation.

When searching for and/or receiving recommendations on devices/apps to make a purchase, household users need to be able to understand the relevance and importance of these devices/apps for their own existing home network system configuration. To this end, the following describes a recommender system that will adopt the centrality characterization of devices/apps to recommend relevant and important additions to a home network based on knowledge of the existing home network system configuration and/or household user's behaviors in the real-world/virtual environments. The subject recommender system, based on active searches by and/or associating behaviors of household users in the real-world/virtual environments, will identify relevant devices/apps, numerically rank them based on degrees of centrality, and recommend the ones with a high degree of centrality (or importance) when added to the existing home network system configuration.

More particularly, the described system may, in response to a search, query, or association by household user, incorporate a search result having a listing of a plurality of potential network devices/apps. Dataflow data for each of the plurality of potential network devices considered as being coupled with one or more existing network devices and/or apps installed on one or more existing network devices within a home network system configuration of a user is retrieved from a system database. The dataflow data is used with a weighted ranking algorithm to assign a priority to each of the plurality of potential network devices. The priority assigned to each of the plurality of potential network devices is then used to order the listing of the plurality of potential network devices. In other instances, rather than providing a recommendation to a user as a search result, a recommendation can be provided to a user as a targeted or reverse advertisement service.

BRIEF DESCRIPTION OF THE DRAWINGS

For a better understanding of the various aspects of the described examples, reference may be made to preferred embodiments shown in the attached drawings in which.

DETAILED DESCRIPTION

Known recommender systems do not have the capability to consider the existing home network system configuration of a household user in its entirety to make recommendations on devices/apps. The subject recommender system, which includes one or more processing devices and a memory for storing instructions for performing the various steps described hereinafter, provides a technical solution to this problem by using a novel quantitative method to estimate the perceived importance of devices/apps for the existing home network system configuration of a household user.

More particularly, while known recommender systems use techniques such as collaborative filtering to make predictions about the preference of a user based on information about the preferences of many similar users, the subject recommender system makes automated and/or query-based recommendations on devices/apps based on their relevance and perceived high importance for the existing home network system configuration of the household user. The subject configuration-based recommender system constructively exploits knowledge of the dataflows that are set up for each compatible/interoperable device/app in the existing home network system configuration and the resulting degree of centrality for the relevant device/app after unification.

Figure 1:
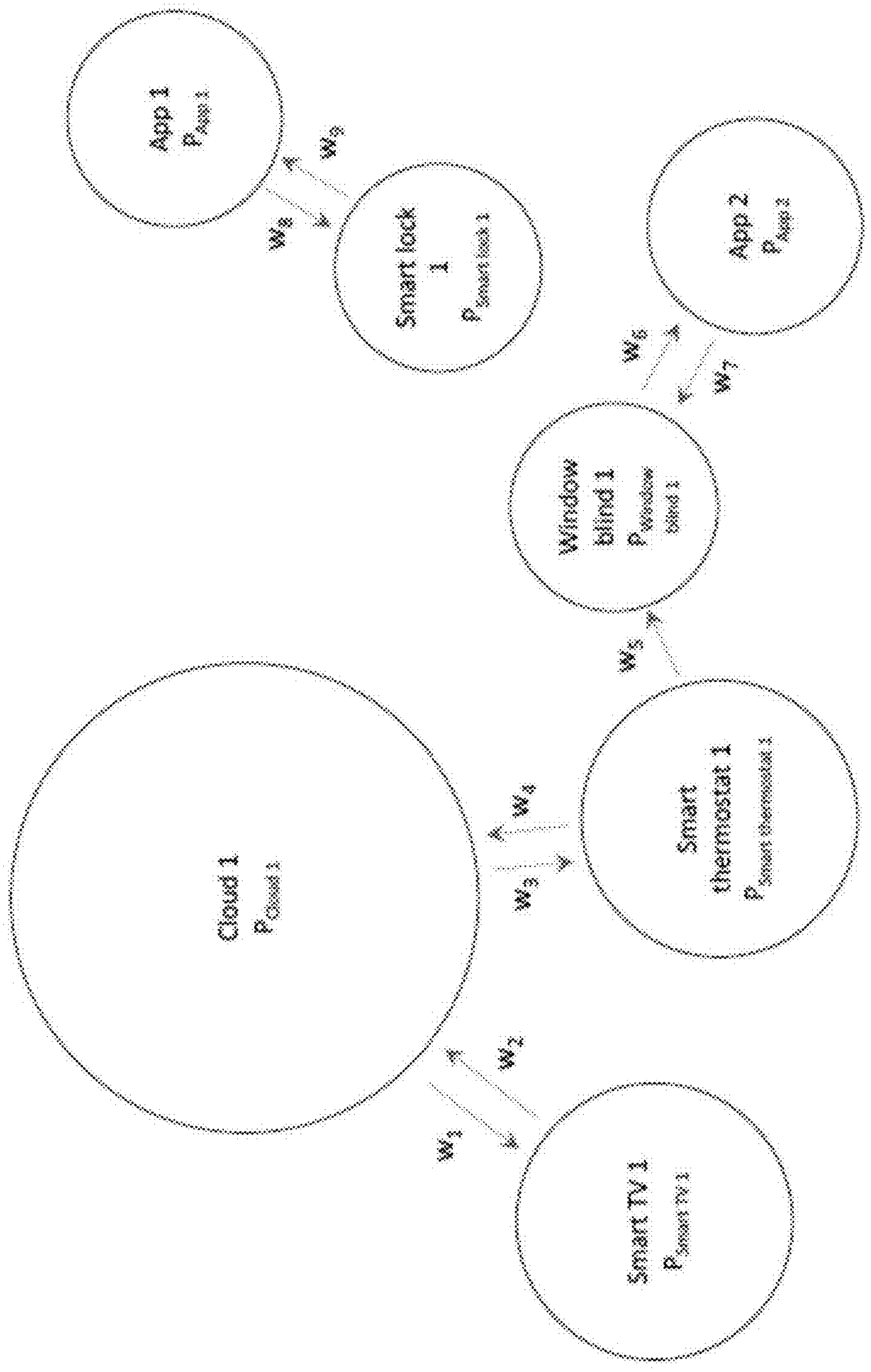
FIG. 1 illustrates a home network system configuration.
Figure 2:
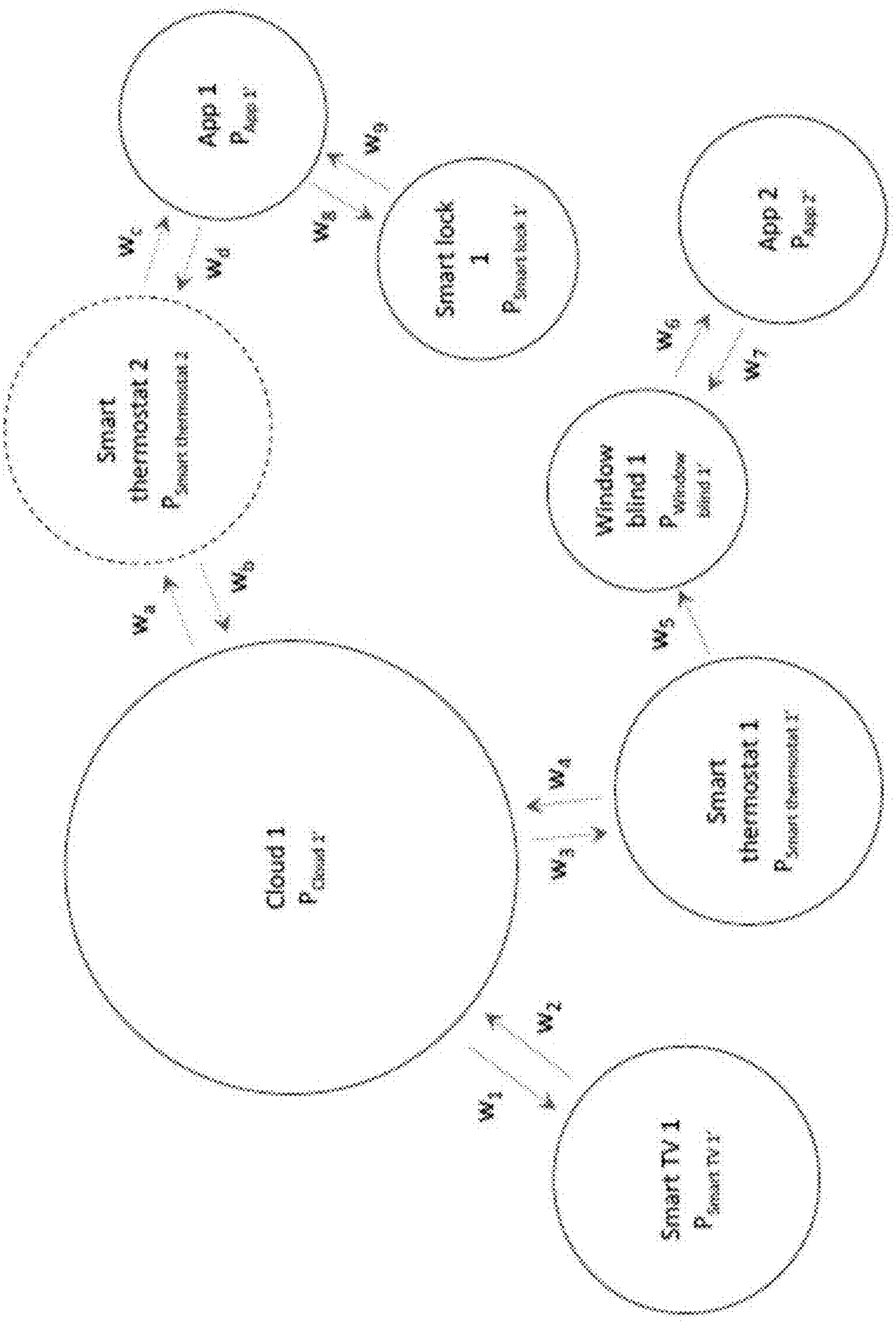
FIG. 2 illustrates the home network system configuration of FIG. 1 in which one possible device with its available dataflows and respective weights being added thereto.
Figure 3:
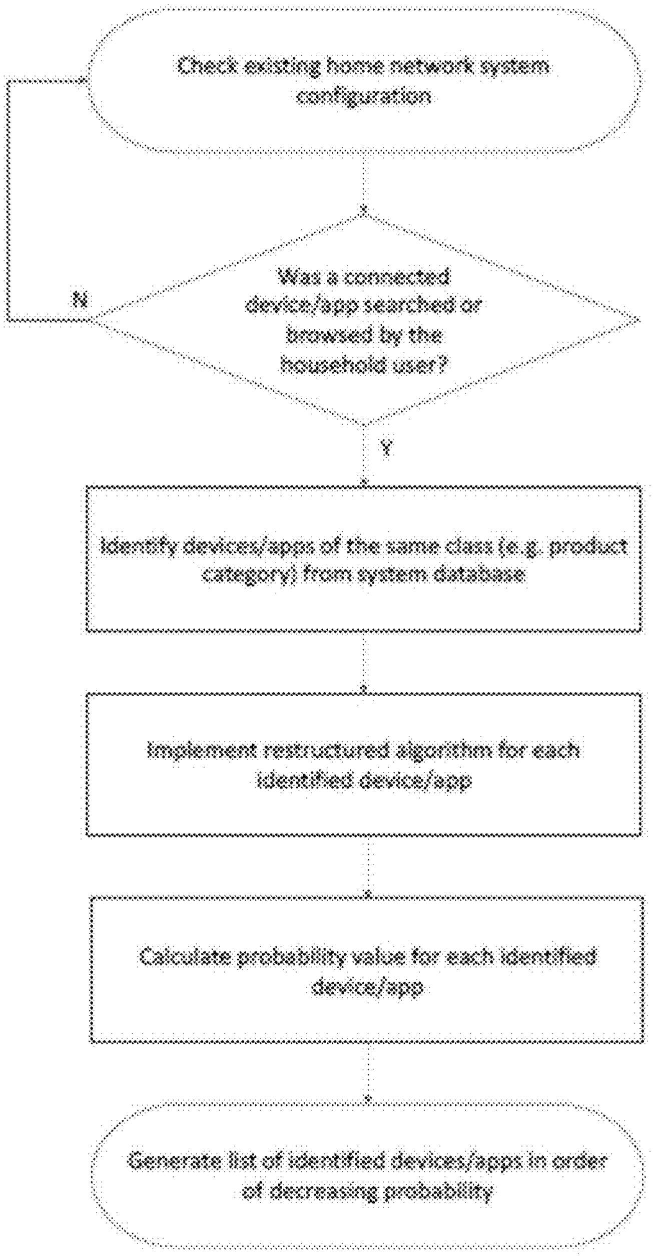
FIG. 3 illustrates an example method for recommending a device and/or an app for integration into a home network system configuration.

Turning now to FIGS. 1-3, a novel configuration-based recommender system is established for the digital platform under a connected smart home environment to recommend relevant and important additions based on knowledge of the existing home network system configuration and/or household user's behaviors in the real-world/virtual environments. The configuration-based recommender system provides relevance by recognizing the devices/apps and their classes from the searching/browsing behaviors of household users in the real-world (e.g. internet search or the like) and/or virtual world (e.g. metaverse shopping or the like) environments and/or by automatically identifying devices/apps and their classes that are determined to have high importance for the existing home network system configuration. Device/app recognition and monitoring may be performed using one or more of the techniques described in U.S. application Ser. No. 19/057,689 and U.S. application Ser. No. 19/001,106, which applications are incorporated herein by reference in their entireties. The configuration-based recommender system provides focus on importance by numerically ranking relevant devices/apps based on the degree of centrality (or probability value) that would emerge when a device or app is added to the existing home network system configuration. Furthermore, the configuration-based recommender system utilizes accumulated data and machine learning to continuously improve the quality of its service to provide relevance and focus on importance, thereby harnessing the power of data network effects.

To recommend relevant and important devices/apps, the configuration-based recommender system uses a restructuring of the weighted PageRank algorithm, which was originally intended to estimate the importance of a website as a probability value by iteratively tracking the links from one website to another and then associating weights for these links in the ranking calculations. The restructured algorithm instead estimates the importance of a device/app (taking the place of a website) as a probability value by iteratively tracking the dataflows (taking the place of links) from one device/app to another and then associating weights for these dataflows in the ranking calculations. The restructured algorithm relies on an underlying basic assumption that more important devices/apps receive dataflows from more devices/apps as well as from other important devices/apps.

As one use-case example, an existing home network system configuration, prior to addition of a device/app, is represented in the diagram of FIG. 1. Each connected device/app (which may also include the cloud), such as Cloud 1, Smart TV1, Smart Thermostat 1, Window Blind 1, Smart Lock 1, App 1, and App 2, has a probability value (e.g., $P_{Smart\ TV1}$) associated with it to estimate its importance as well as trackable dataflows with respective weights (e.g., $w_1$ to $w_9$). Implementation of the restructured algorithm by the configuration-based recommender system is predicated on the understanding of the operational/behavioral dataflows that are set up among compatible/interoperable devices/apps, either directly or via the cloud (e.g. device-to-device, device-to-app, app-to-device, app-to-app, cloud-to-device, cloud-to-app, or the like), in the connected smart home ecosystem. Dataflow identifiers that are set up for each connected device/app are defined in terms of source/destination and weight. In FIG. 1, for example, one of the dataflow identifiers for Smart TV 1 is {source=Cloud 1, weight=$w_1$}. The other dataflow identifier for Smart TV 1 is {destination=Cloud 1, weight=$w_2$}.

In the context of the connected smart home environment, weights for the data inflows and outflows (e.g., $w_1$ to $w_9$) are utilized by the configuration-based recommender system to account for the relative differences in usage, applicability, popularity, etc. among household users and may be set up either manually or automatically via the administration system. In addition, these identifiers are continuously accumulated in the digital platform database for existing and new devices/apps to collectively establish the dataflow identifier superset. Accordingly, corresponding dataflow identifiers for the existing home network system configuration are automatically determined for further application by the configuration-based recommender system.

Furthermore, just as the weighted PageRank algorithm utilizes a damping factor (d) to simulate random jumps by a web surfer to access different websites that are disconnected from others, the restructured algorithm for the configuration-based recommender system also utilizes a damping factor to simulate random jumps by a household user to access different devices/apps that are disconnected from other parts of the home network system configuration, thereby further enhancing practicality. In the diagram of FIG. 1, Smart lock 1 and App 1 are disconnected from other parts of the home network system configuration. However, the restructured algorithm simulates their use by household users based on the application of a damping factor.

To continue with the use-case example, the household user searches for smart thermostats on the internet and/or in the metaverse store with an aim towards adding a smart thermostat to his/her existing real-world or virtual environment. The configuration-based recommender system, which automatically identifies the possibly relevant devices/apps and their classes from this searching/browsing behavior, then automatically implements the restructured algorithm for each identified device/app (e.g., each smart thermostat located in database). To quantify the importance of each relevant device/app, which has its own identifiers for operational/behavioral dataflows, the relevant device/app needs to be hypothetically unified with the existing home network system configuration. FIG. 2 thus shows the unified scenario in which one of the possible, relevant devices (Smart thermostat 2) with its available dataflows and respective weights (e.g. $w_a$ to $w_d$) is added to the existing home network system configuration and shown as dotted lines. The configuration-based recommender system will automatically analyze the unification scenario for the relevant device/app (e.g., Smart thermostat 2) and the existing home network system configuration to determine the numerical ranking/probability value, or degree of centrality, for the relevant device/app (e.g., $P_{Smart\ thermostat\ 2}$). This numerical ranking/probability value for potentially usable Smart thermostat 2 is then automatically used by the configuration-based recommender system to make overall comparisons with those for the other relevant devices/apps (e.g., additional smart thermostats identified via use of the search), thereby determining the ordering of the actual recommendations made by the configuration-based recommender system for smart thermostats.

The configuration-based recommender system may arrange automated and/or query-based recommendations to household users as custom search results (e.g. internet browser, app, or the like) with the listing of highly ranked devices/apps or as targeted/reverse advertisements as a service based on pre-arranged agreements with sellers. These pre-arranged agreements with sellers may include, for example, targeted/reverse advertisements that are automatically sent when a pre-defined threshold numerical ranking/probability value is fulfilled by the relevant device/app, thereby establishing an automatic triggering mechanism.

As noted, the automatic identification of the devices and apps within an ecosystem and the monitoring of the dataflows that occur between devices can be accomplished using one or more of the techniques described in incorporated U.S. application Ser. No. 19/057,689 and U.S. application Ser. No. 19/001,106. Collected dataflow data may be stored in a relational database and the dataflows, with the corresponding weights, may be identified as being inbound or outbound and as being between a first auto-detected device of a specific type, make, and model and a second auto-detected device of a specific type, make, and model. The system can continuously collect the dataflow information from each ecosystem that utilizes the services set forth in the incorporated applications. The continuous collection of dataflow data is particularly advantageous as it will allow the system to maintain dataflow information for both existing and new devices/apps.

As further shown in FIG. 3 which outlines the implementation method of configuration-based recommender system, one or more of the techniques described in incorporated U.S. application Ser. No. 19/057,689 and U.S. application Ser. No. 19/001,106 is utilized to collect dataflow data and to populate the database with dataflow information for application by the system. In addition, one or more of the techniques described in incorporated U.S. application Ser. No. 19/057,689 and U.S. application Ser. No. 19/001,106 is utilized to determine the existing home network system configuration of a user for application by the system. With knowledge of the devices/apps within the existing network system configuration of the user, e.g., types of devices, brands of devices, models of devices, the app IDs, etc., the relevant dataflow information for those devices/apps within the home network system configuration can be retrieved from the database as needed. In particular, when a user searches for a device or app for possible integration into his/her home network system configuration (real or virtual) as a possible addition or replacement for an existing device/app, the inbound and outbound dataflow information for each possible device/app in the search result (e.g., each relevant smart thermostat) to represent links with one or more devices/apps within the home network system (e.g., Cloud 1 and App 1) can be retrieved for use in providing a recommendation (e.g., as to which smart thermostat should be selected by the user for integration into his/her home network). The recommender system will apply the restructured weighted PageRank algorithm considering the dataflows for each of the possible devices/apps and the existing devices/app and will calculate a probability value for each device/app. The calculated probability value will then be used to rank the list of the possible devices/apps that was were identified in the search, e.g., from highest probability value to lowest.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A system comprising:

one or more processors; and a memory storing instructions that, when executed by the one or more processors, configure the system to perform operations comprising:

receiving a search result comprising a listing of a plurality of potential network devices;

accessing, from a database coupled to a server computer, dataflow data for each one of the plurality of potential network devices considered as being communicatively coupled with one or more existing network devices and/or apps installed on one or more existing network devices within a home network system configuration of a user, wherein the dataflow data stored in the database is defined for each of the plurality of potential network device in terms of a source, a source weight, a destination, and a destination weight;

using the dataflow data with a weighted ranking algorithm to assign a priority to each one of the plurality of potential network devices;

using the priority assigned to each one of the plurality of potential network devices to order the listing of the plurality of potential network devices; and providing the ordered listing of the plurality of potential network devices to the user.

2. The system as recited in claim 1, wherein the operations further comprise using an importance value assigned to each of the one or more existing network devices and/or apps to order the listing of the plurality of potential network devices.

3. The system as recited in claim 2, wherein the operations further utilize a machine learning process to determine the corresponding source weight, the corresponding destination weight for each of the plurality of types and brands of devices and service apps, and the importance value assigned to each of the one or more existing network devices and/or apps.

4. The system as recited in claim 1, wherein the operations further utilize a machine learning process to determine the corresponding source weight and the corresponding destination weight for each of the plurality of types and brands of devices and service apps.

5. A system comprising:

one or more processors; and a memory storing instructions that, when executed by the one or more processors, configure the system to perform operations comprising:

receiving a search result comprising a listing of a plurality of potential apps installable on one or more existing network devices within a home network system configuration of a user;

accessing, from a database coupled to a server computer, dataflow data for each one of the plurality potential apps as installed on one or more of the existing network devices within the home network system configuration of a user considered as being communicatively coupled with a different one or more of the existing network devices and/or apps installed on one or more of the existing network devices within the home network system configuration of the user, wherein the dataflow data stored in the database is defined for each of the plurality of potential apps in terms of a source, a source weight, a destination, and a destination weight;

using the dataflow data with a weighted ranking algorithm to assign a priority to each one of the plurality of potential apps;

using the priority assigned to each one of the plurality of potential apps to order the listing of the plurality of potential apps; and providing the ordered listing of the plurality of potential apps to the user.

6. The system as recited in claim 5, wherein the operations further comprise using an importance value assigned to each of the one or more existing network devices and/or apps to order the listing of the plurality of potential network devices.

7. The system as recited in claim 6, wherein the operations further utilize a machine learning process to determine the corresponding source weight, the corresponding destination weight for each of the plurality of types and brands of devices and service apps, and the importance value assigned to each of the one or more existing network devices and/or apps.

8. The system as recited in claim 5, wherein the operations further utilize a machine learning process to determine the corresponding source weight and the corresponding destination weight for each of the plurality of types and brands of devices and service apps.

* * * * *